United States Patent
Westrick, Jr.

(10) Patent No.: US 10,694,606 B1
(45) Date of Patent: Jun. 23, 2020

(54) LIGHTING CONTROL SYSTEM COMMISSIONING USING LIGHTING CONTROL SYSTEM SENSORS

(71) Applicant: ABL IP Holding LLC, Atlanta, GA (US)

(72) Inventor: Richard Lee Westrick, Jr., Social Circle, GA (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 16/571,674

(22) Filed: Sep. 16, 2019

(51) Int. Cl.
| | |
|---|---|
| H05B 37/02 | (2006.01) |
| H05B 47/10 | (2020.01) |
| H05B 47/105 | (2020.01) |
| H05B 47/19 | (2020.01) |
| H05B 47/185 | (2020.01) |

(52) U.S. Cl.
CPC ......... H05B 47/105 (2020.01); H05B 47/185 (2020.01); H05B 47/19 (2020.01)

(58) Field of Classification Search
CPC .............. H05B 37/02; H05B 37/0227; H05B 37/0245; H05B 37/0263; H05B 37/0272; H05B 37/034; H05B 37/038; H05B 47/10; H05B 47/105; H05B 47/185; H05B 47/19
See application file for complete search history.

(56) References Cited

U.S. PATENT DOCUMENTS

| | | | |
|---|---|---|---|
| 9,137,879 B2 | 9/2015 | Rains, Jr. et al. | |
| 9,504,132 B2 | 11/2016 | Aggarwal et al. | |
| 9,538,617 B2 | 1/2017 | Rains, Jr. et al. | |
| 9,829,870 B2 | 11/2017 | Aggarwal et al. | |
| 2008/0242314 A1* | 10/2008 | McFarland | G08C 17/02 455/456.1 |
| 2009/0066473 A1* | 3/2009 | Simons | G01S 5/0027 340/3.1 |
| 2009/0218951 A1* | 9/2009 | Weaver | H05B 37/0272 315/154 |
| 2009/0299527 A1* | 12/2009 | Huizenga | H05B 37/0245 700/275 |
| 2010/0114340 A1* | 5/2010 | Huizenga | H05B 37/0272 700/90 |

* cited by examiner

*Primary Examiner* — Thai Pham
(74) *Attorney, Agent, or Firm* — Kilpatrick Townsend & Stockton LLP

(57) ABSTRACT

A method for commissioning a lighting control system includes selecting a control device for a lighting group in the lighting control system, and receiving, via the control device for the lighting group, a first instruction to the lighting control system. The first instruction may cause devices in the lighting control system to enter a pairing mode. A first device to be associated with the control device may be selected based on motion of a person in a vicinity of the first device detected by a sensor. The first device may be associated with the lighting group for a specified space based on the motion detected by the sensor. A second instruction may be received via the control device for the lighting group and, in response to the second instruction, the lighting control system may exit the pairing mode.

23 Claims, 7 Drawing Sheets

LIGHTING CONTROL SYSTEM COMMISSIONING USING LIGHTING CONTROL SYSTEM SENSORS

BACKGROUND

Unless otherwise indicated herein, the materials described in this section are not prior art to the claims in this application and are not admitted to be prior art by inclusion in this section.

Lighting systems include lighting fixtures (e.g., luminaires), sensors (e.g., occupancy sensors), and lighting controllers. It is increasingly common for lighting fixtures to be equipped with individual occupancy sensors and control devices. These sensors and devices add to the complexity of system setup and programming, as each needs to be identified and grouped, for example by a technician, as part of programming the specified sequence of operations for the installation. With conventional software setup and programming methods for lighting systems, a user manually identifies and programs each control point to create lighting zones. Manually identifying and programming the control points takes considerable time and introduces opportunities for error.

In some cases, lighting systems may cause individual lighting fixtures to generate special coded light signals for use in conjunction with a mobile device to help a technician identify and program the lighting fixtures. However, the use of coded light signals requires special, and uncommon, capabilities of the driver and light engine in each lighting fixture. Other lighting systems use a custom laser "wand" that the technician uses to trigger light sensors in the lighting fixtures to identify and program them. The laser wand requires careful aiming to align the laser beam with the correct sensor in the lighting fixture. Additionally, the laser wand is a special piece of equipment that must be purchased and kept track of for future use. Often, initial set up (e.g., commissioning) of lighting fixtures and switches in a lighting installation is performed by a technician having little familiarity with the lighting control system. Thus, the commissioning procedure should be uncomplicated to minimize set up errors.

SUMMARY

Systems and methods for commissioning lighting control systems are provided.

According to various aspects there is provided a method for commissioning a lighting control system. In some aspects, the method may include selecting a control device for a lighting group in the lighting control system, and receiving, via the control device for the lighting group, a first instruction to the lighting control system. The first instruction may cause devices in the lighting control system to enter a pairing mode. A first device to be associated with the control device may be selected based on motion of a person in a vicinity of the first device detected by a sensor. The first device may be associated with the lighting group for a specified space based on the motion detected by the sensor. A second instruction may be received via the control device for the lighting group and, in response to the second instruction, the lighting control system may exit the pairing mode.

Associating the first device with the lighting group may include storing in a data structure in a memory an identification of the control device and an identification of the first device associated with an identification of the lighting group. The data structure may be stored in a memory of the control device and in a memory of the first device. The first device may be a light fixture. Entering the pairing mode may include reducing a sensitivity of the sensor and changing an intensity of light emitted by the light fixture to a first level.

The method may further include, in response to associating the first device with the lighting group, while in pairing mode, changing an intensity of light emitted by the first device from a first level to a second level. The first device may be a light fixture. The motion may be detected by an occupancy sensor embedded in the light fixture, by a directionally aware occupancy sensor, or by a sensor mounted in a location in the specified space other than on the first device.

The control device may be a wall station, and the first instruction received by the wall station may cause the wall station to broadcast a command to the first device to command the first device into the pairing mode. In some implementations, the first instruction received by the wall station may be transmitted to a central controller, and the central controller may command the first device into the pairing mode.

The lighting control system may be a wired system including a central controller configured to communicate with a plurality of networks, the control device may be communicatively coupled to a first network, the first device may be communicatively coupled to a second network, and the central controller may be configured to associate the control device on the first network with the first device on the second network.

According to various aspects there is provided a lighting control system. In some aspects, the lighting control system may include a central controller, a plurality of light fixtures in communication with the central controller, and a control device in communication with the central controller. The control device may be configured to receive, via a user interface, a first instruction for the lighting control system to enter a pairing mode and transmit the first instruction to the central controller. The central controller may be configured to receive the first instruction and generate a first command to cause the plurality of light fixtures to enter a pairing mode. In the pairing mode, each light fixture of the plurality of light fixtures may be operable to receive an indication that motion occurred in a vicinity of one or more light fixtures of the plurality of the light fixtures, and transmit a signal to the central controller from each of the one or more light fixtures of the plurality of light fixtures indicating that motion occurred in the vicinity of the one or more light fixtures of the plurality of light fixtures. In response to receiving the signal, the central controller may be further configured to associate the one or more light fixtures of the plurality of light fixtures with a lighting group controlled by the control device.

The central controller may be further operable to store in a data structure in a memory an identification of the control device and an identification of one or more light fixtures of the plurality of light fixtures associated with an identification of the lighting group. In the pairing mode, each light fixture in the plurality of light fixtures may change its emitted light level to a first level. In response to being associated with a lighting group, each light fixture in the plurality of light fixtures associated with the lighting group may change its emitted level to a second level as an indication that it has been associated with the lighting group. The motion may be detected by an occupancy sensor embedded in the light fixture, by a directionally aware occupancy sensor, or by a sensor mounted in a location in the specified space other than on one of the plurality of light fixtures.

According to various aspects there is provided a system. In some aspects, the system may include a plurality of light fixtures and a wall station in communication with the plurality of light fixtures. The wall station may be configured to receive, via a user interface, a first instruction for the system to enter a pairing mode and broadcast a command based on the first instruction to command the plurality of light fixtures into a pairing mode. In the pairing mode, each light fixture of the plurality of light fixtures may be operable to receive an indication that motion occurred in a vicinity of one or more light fixtures of the plurality of the light fixture and generate a signal to an embedded controller of the one or more light fixtures of the plurality of light fixtures indicating that motion occurred in the vicinity of the one or more light fixtures. In response to the signal, the embedded controller of the one or more light fixtures may be further configured to associate the one or more light fixtures of the plurality of light fixtures with a lighting group controlled by the wall station, and transmit a signal to the wall station indicating that the one or more light fixtures are associated with the wall station.

The embedded controller of the one or more light fixtures may be further configured to store in a data structure in a memory an identification of the wall station and an identification of one or more light fixtures of the plurality of light fixtures associated with an identification of the lighting group. The wall station may be further configured to store in a data structure in a memory an identification of the wall station and an identification of one or more light fixtures of the plurality of light fixtures associated with an identification of the lighting group.

Each light fixture in the plurality of light fixtures may include an embedded occupancy sensor, and motion in a vicinity of each light fixture in the plurality of light fixtures may be detected by the occupancy sensor embedded in the light fixture. In some implementations, motion may be detected by an occupancy sensor embedded in the light fixture, by a directionally aware occupancy sensor, or by a sensor mounted in a location in a specified space other than on one of the plurality of light fixtures.

Numerous benefits are achieved by way of the various embodiments over conventional techniques. For example, the various embodiments provide systems and methods that can be used to simplify commissioning of lighting control systems. In some embodiments, distributed sensing by sensors embedded in light fixtures enables identification of the light fixtures to be associated with a lighting group. In other embodiments, directionally aware centralized sensors provide the motion detection and identification. These and other embodiments along with many of the advantages and features are described in more detail in conjunction with the text below and attached figures.

BRIEF DESCRIPTION OF THE DRAWINGS

Aspects and features of the various embodiments will be more apparent by describing examples with reference to the accompanying drawings, in which.

DETAILED DESCRIPTION

Figure 1A:
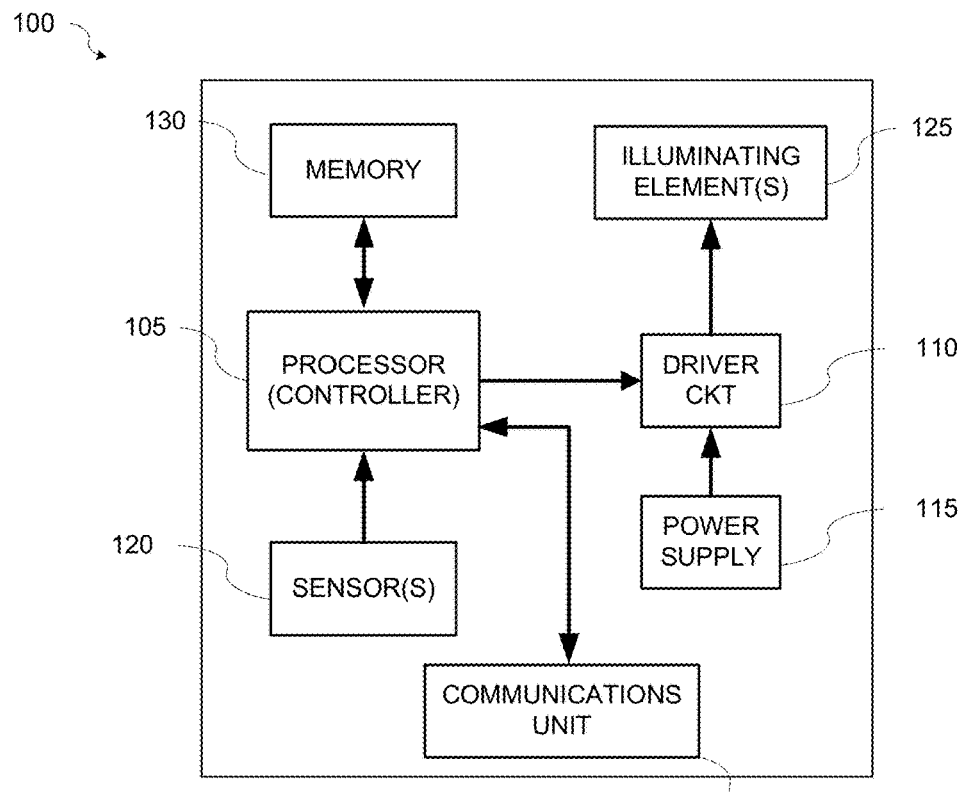
FIG. 1A is a block diagram of an example of a light fixture according to aspects of the present disclosure.

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

A lighting control system may include, among other things, devices such as light fixtures, sensors (e.g., occupancy sensors or other sensors), wall stations (e.g., switches or other control devices), and a central controller or distributed controllers embedded in the devices. The sensors may also be centralized (e.g., one sensor mounted in a space to sense motion for a group of light fixtures) or distributed (e.g., embedded in the light fixtures and/or control devices). Initial setup, also referred to herein as commissioning, of the lighting control system involves associating light fixtures with control devices to form lighting groups. For example, light fixtures located in a particular room should be associated with control devices, for example wall stations and/or sensors, located in the same room. In addition, the initial set up should exclude light fixtures and/or control devices that should not be part of a defined lighting group, for example light fixtures and control devices in another room or floor, particularly with a wireless lighting control system. For example, signals from a wireless radio frequency (RF) lighting control system can penetrate walls and so can cause light fixtures and/or control devices in adjacent rooms and/or floors to unintentionally become part of a lighting group.

Both wired and wireless lighting control systems can present difficulties when trying to identify devices to be included in in lighting groups. For example, in a digital addressable lighting interface (DALI) control system, two-wire control wiring is installed along with the power wiring for each device. Light fixtures and control devices (e.g., wall stations) have addresses and so can communicate individually over a network. In some implementations, switches can be on one network and light fixtures on another network. The two networks may be associated through a central controller. Thus, the networks can span different rooms upon installation. There may be no association between the physical wiring and the networks to which wall stations and light fixtures belong. In some cases, wall stations and fixtures on different networks may need to be part of same logical grouping (i.e., lighting group). With wireless lighting control systems, the lighting groups are formed by wireless communication between the devices. Each individual wireless device (e.g., light fixtures, wall stations, sensors, etc.) is associated with a particular lighting group based on for example, an IP address, MAC address, or other network address or identifier, by responding to a broadcast message from one of the devices (e.g., a wall station). Thus, with both wired and wireless lighting control system, forming lighting groups during initial set up, or commissioning, may be difficult, in particular when commissioning of the lighting control system is performed by a technician having little or no experience with a particular lighting control system.

FIG. 1A is a block diagram of a light fixture 100 according to aspects of the present disclosure. Referring to FIG. 1A, the light fixture 100 may include an embedded controller or processor 105, driver circuitry 110, a power supply 115, one or more sensors 120, one or more illuminating element(s) 125, a memory 130, and a communications unit 135. The embedded controller or processor 105 may control overall operation of the light fixture 100. The embedded controller or processor 105 may be a microprocessor, microcomputer, computer, microcontroller, programmable controller, or other programmable device. The embedded controller or processor 105 may be part of a distributed lighting control network in which the controllers in each device communicate with each other without involvement of a central lighting controller. Alternatively, the embedded controller or processor 105 may communicate with a central lighting controller as part of a centrally controlled lighting control system.

The embedded controller or processor 105 may communicate with a memory 130. The memory 130 may be processor-readable solid state storage media, for example, but not limited to, RAM, ROM, EEPROM, FLASH memory, or other solid state storage devices that may be used to store desired program code in the form of instructions or data structures and that may be accessed by and/or operated upon by the embedded controller or processor 105.

The power supply 115 may supply power for the illuminating element(s) 125. The power supply 115 may be, for example, an AC-DC converter, a DC-DC converter, or an AC-AC converter. The power supply 115 may be included within a housing of the light fixture 100 or may be external to the light fixture 100. The embedded controller or processor 105 may provide control signals to the driver circuitry 110 to control the illumination characteristics of the illuminating element(s) 125. For example, the embedded controller or processor 105 may receive lighting control protocol input signals such as DMX512, DALI, ZIGBEE, Bluetooth® or other lighting control protocol and based on the input signals, generate the control signals to the driver circuitry 110. The driver circuitry 110 may control the power provided to the illuminating element(s) 125 from the power supply 115. In some implementations, the driver circuitry 110 and/or driver functions may be incorporated into the power supply 115 and the embedded controller or processor 105 may provide control signals to the power supply 115. Based on instructions received from the embedded controller or processor 105, the driver circuitry 110 may control lighting characteristics, for example, but not limited to, intensity, color temperature, color of light, or other lighting characteristic, produced by the illuminating element(s) 125. The illuminating element(s) 125 may be a light-emitting diode (LED), organic LED (OLED), a tunable fluorescent lamp, and/or other light emitting device(s).

The one or more sensors 120 may sense the motion of an occupant in the vicinity of the light fixture 100, for example in a room monitored by the one or more sensors 120. The one or more sensors 120 may include an occupancy sensor, for example, but not limited to, passive infrared (PIR) sensors, radar sensors, "time of flight" (TOF) sensors, (e.g., laser, radio, acoustic, etc.), and ultra-wideband (UWB) sensors. PIR sensors detect infrared radiation (i.e., radiant heat) emitted by or reflected from objects in their field of view. Doppler radar based occupancy sensors transmit a known continuous wave frequency and continuously detect reflections from objects within their field. TOF sensors measure the distance between the sensor and an object based on the time difference between the emission of the signal (e.g., an optical or acoustic signal) and its return to the sensor after being reflected by the object. UWB sensors use impulse radar techniques for emitting and sampling signal pulses to achieve accurate distance measurements determined by the time differences between transmitted and received pulses.

Other sensors that may be used include infrared (IR) sensors, ultrasonic sensors, audio sensor arrays, distance-based photoelectric sensors, radio frequency identification (RFID) tag readers, near field communication (NFC) tag readers, a Bluetooth® radio, a $^{WiFi}$® radio from a mobile device carried by the occupant, or other ranging technology sensors capable of detecting the presence of an occupant near the light fixture and/or the distance of an occupant from the light fixture, or combinations thereof. In some implementations, these sensors may only detect motion or whether any occupant is near the fixture, while in other implementations the sensors may have sufficient resolution to be capable of detecting the number occupants within range of the sensor. Other variations of the light fixture 100 may be implemented without departing from the scope of the present disclosure. In some implementations, for example when a centralized sensor mounted on a wall or ceiling (i.e., one sensor communicating with the other devices of a lighting group in a room or other space) is used, the light fixture may not include one or more of the sensors 120 or one or more of the sensors included in the light fixture may be unused.

The communications unit 135 may enable the light fixture to communicate via a wired or wireless network. The communication unit 135 may represent one or more components that facilitate a network connection. In some implementations, the communication unit 135 may be a wireless communication device and can include wireless interfaces such as IEEE 802.11, Bluetooth, or other radio interfaces for accessing cellular telephone networks (e.g., transceiver/antenna for accessing a CDMA, GSM, UMTS, or other mobile communications network). In other implementations, the communication unit 135 may include a wired communication device and can include interfaces such as Ethernet, EIA RS-485, USB, IEEE 1394, or a fiber optic interface. In still other implementations, the communication unit 135 may include both wireless and wired communication devices.

A wall station may provide control functions, for example, but not limited to, on-off switching, dimming, color control, etc., for light fixtures in a lighting group. Commands (e.g., on/off, dim, etc.) for a lighting group may be received via the wall station. In some implementations, commands received by the wall station may be transmitted to a central lighting controller and the central lighting controller may communicate the commands wirelessly or over a wired connection to embedded controllers in the light fixtures of the lighting group. The central lighting controller may associate light fixtures on different networks with one lighting group and transmit the commands accordingly. In some implementations without a central lighting controller, an embedded controller in the wall station may communicate the commands to embedded controllers in the light fixtures of the lighting group.

Figure 1B:
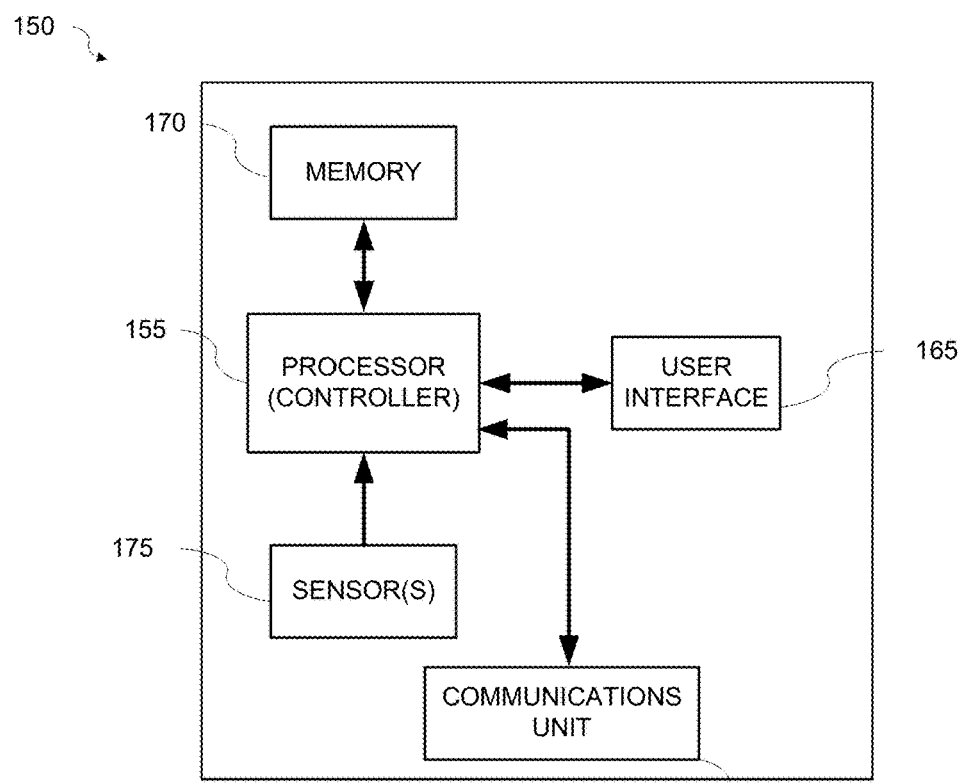
FIG. 1B is a block diagram of an example of a wall station according to aspects of the present disclosure.

FIG. 1B is a block diagram of an example of a wall station 150 according to various aspects of the present disclosure. The wall station 150 may include an embedded controller or processor 155 and/or may communicate wirelessly or over a wired connection via a communication unit 160 with a central lighting controller and/or light fixtures and/or sensors in a lighting group. The wall station 150 may also provide programmable functionality (e.g., setting light levels, programming on-off times, etc.) for the devices in a lighting group, for example via communication with a central controller or the embedded controller or processor 155 of the wall station 150.

The embedded controller or processor 155 may be a microprocessor, microcomputer, computer, microcontroller, programmable controller, or other programmable device. The embedded controller or processor 155 may be part of a distributed lighting control network in which the controllers in each device communicate with each other without involvement of a central lighting controller. Alternatively, the embedded controller or processor 155 may communicate with a central lighting controller as part of a centrally controlled lighting control system. The embedded controller or processor 155 may communicate with a memory 170. The memory 170 may be processor-readable solid state storage media, for example, but not limited to, RAM, ROM, EEPROM, FLASH memory, or other solid state storage devices that may be used to store desired program code in the form of instructions or data structures and that may be accessed by and/or operated upon by the embedded controller or processor 155.

The wall station 150 may include a user interface 165, for example, one or more buttons and/or a touch screen or other user interface, to enable a user to input commands for controlling a lighting group. In some implementations, a software application, for example an application executing on a mobile device, may be operable to communicate with the wall station 150 to input commands to the wall station 150. In some implementations, the wall station 150 may include one or more sensors 175, for example, but not limited to, occupancy sensors, light sensors, etc.

Figure 2:
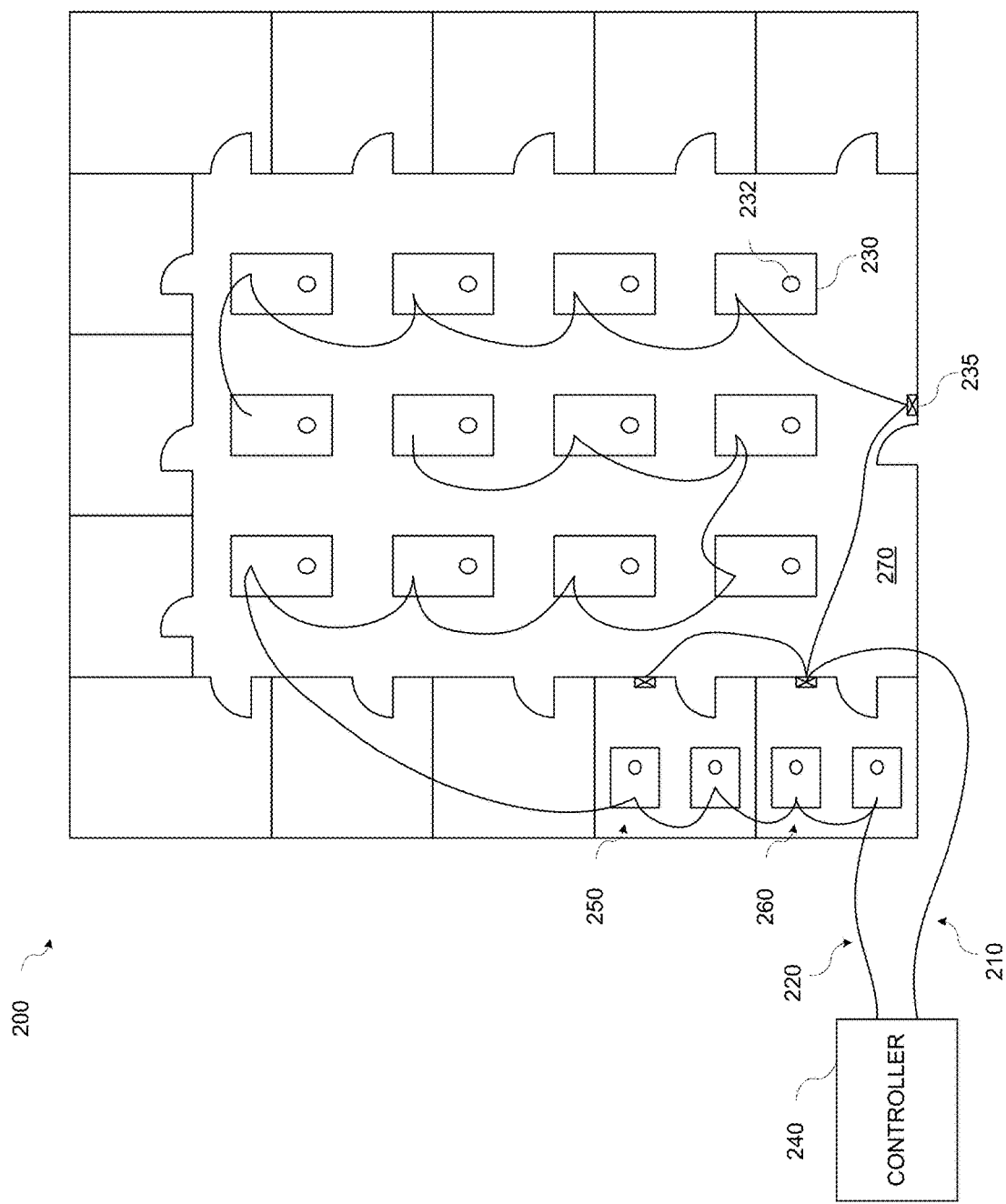
FIG. 2 is a diagram illustrating an example of a lighting control system having a centralized architecture and using distributed sensors according to aspects of the present disclosure.

In some embodiments, a lighting control system may be implemented with a centralized architecture. FIG. 2 is a diagram illustrating an example of a lighting control system 200 having a centralized architecture and using distributed sensors according to aspects of the present disclosure. In a centralized architecture, a central controller may communicate with and control the lighting fixtures, sensors, and wall stations in the lighting installation. FIG. 2 illustrates an example of wired groupings of light fixtures and wall stations in an office lighting installation with open office space surrounded by private offices.

The lighting installation may include more than one network 210, 220 of devices (e.g., light fixtures 230, occupancy sensors 232, wall stations 235, etc.). The networks 210, 220 in the centralized architecture may be wired networks. In a wired implementation, the devices in each network 210, 220 may be wired to a central controller 240, and communication between the central controller and each device may be via the wired connections. Each device may have a network address or other identifier to identify the device on the network. In some cases, the occupancy sensors 232 may be distributed in the light fixtures 230, with each light fixture 230 having its own embedded occupancy sensor 232 to detect motion in the vicinity of the light fixture 230 and provide a motion detection signal to the central controller 240. For example, when the embedded occupancy sensor 232 detects motion of a person near the light fixture 230, the embedded occupancy sensor 232 may generate a signal to the embedded controller or processor (e.g., the controller or processor 105) of the light fixture 230, and the embedded processor may cause the communications unit (e.g., the communications unit 160) to transmit a signal to the central controller 240. The embedded occupancy sensors 232 may be, for example, but not limited to, PIR sensors, ultrasonic sensors, high frequency RF sensors (e.g., UWB, TOF, etc.) or other occupancy sensors.

In some implementations, the central controller may connect two or more networks enabling devices on the different networks to communicate with one another. For example, one or more wall stations 235 (e.g., switches) may be connected to a first network 210 while lighting fixtures 230 and/or sensors 232 may be connected to a second network 220. The central controller 240 may enable connecting the wall stations on the first network 210, for example wall stations in different rooms, to control specified lighting fixtures on the second network 220 located in the corresponding rooms. Any combination of wall stations, light fixtures, and/or sensors may be connected to a network.

The centralized controller may be a physical device located on premise with the lighting control system, or may be a software implementation which is hosted on a remote data center or cloud computing platform such as AWS, Azure, etc., or may be a combination thereof. Similarly, the centralized controller functionality may be implemented across many smaller devices configured as a distributed computing platform, as described, for example, in one or more of U.S. Pat. Nos. 9,538,617, 9,829,870, 9,137,879, and 9,504,132.

In accordance with various aspects of the present disclosure, the distributed occupancy sensors in the lighting control system can be used to simplify the commissioning process by detecting the motion of a technician passing under a light fixture, and based on the detected motion, adding the light fixture to a specified lighting group. Referring to the example of FIG. 2, during commissioning, three lighting groups may be formed: one lighting group for a first private office 250, one lighting group for a second private office 260, and one lighting group for the open office space 270. A lighting group may be formed by commanding devices on the one or more networks of the lighting control system into a pairing mode.

While in pairing mode, devices (e.g., light fixtures) may be selected to form a lighting group using the embedded sensors (e.g., occupancy sensors) to detect motion of a person passing by the devices. In some implementations, the processor or embedded controller of the light fixture or the central controller may change the light intensity emitted by the light fixture to a first level when in pairing mode and change the light intensity to a second level when the light fixture is selected to join a lighting group. The processor or embedded controller of the light fixture or the central controller may cause the light fixture to signal that it has been selected by causing various changes in the light intensity emitted by the light fixture, for example, but not limited to, increasing intensity, decreasing intensity, blinking, changing color, or providing another visual or audible indication. Any of the various changes in light intensity may be used to indicate the first light intensity level or the second light intensity level.

Figure 3:
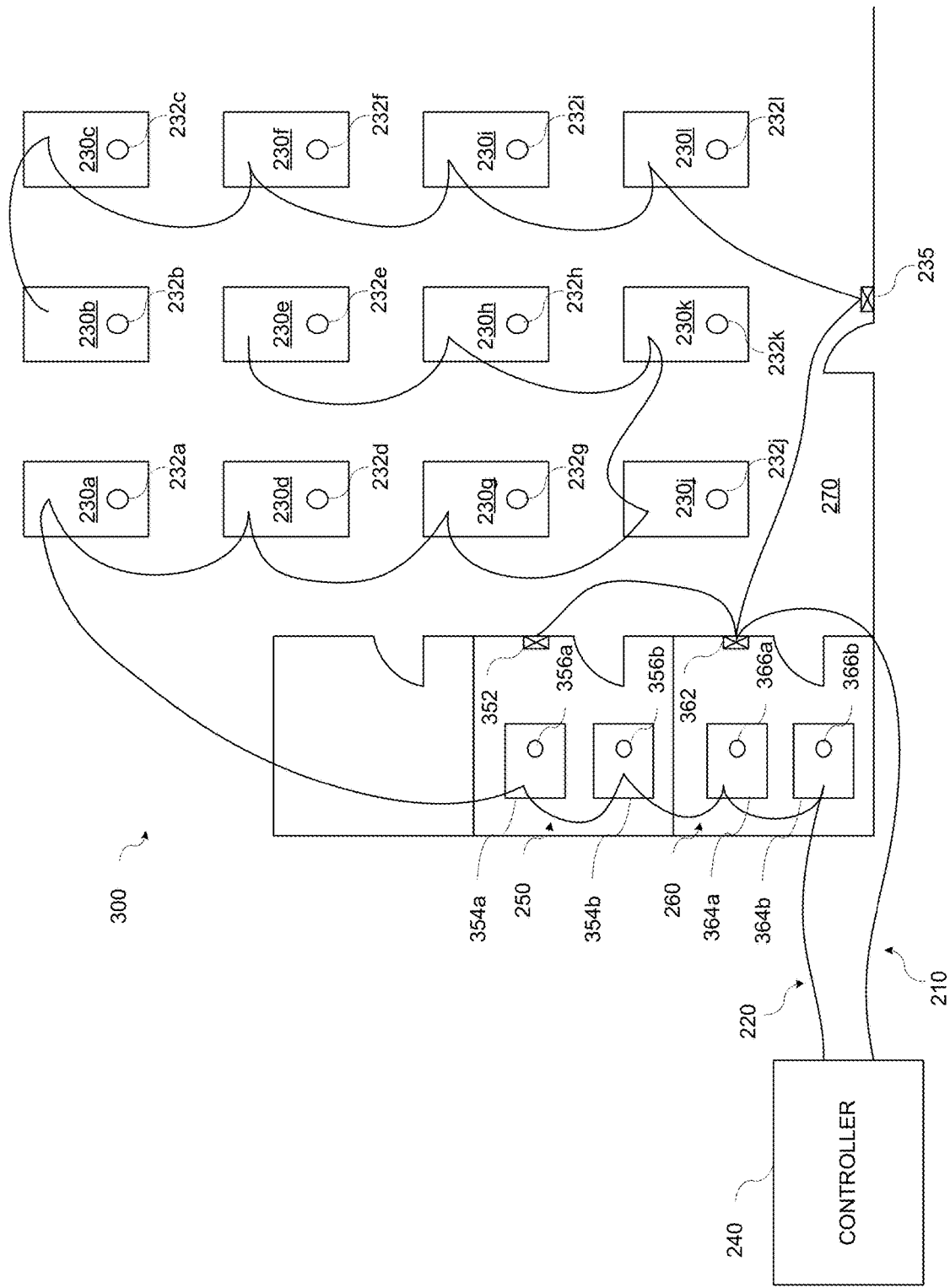
FIG. 3 is a diagram illustrating additional details of the example lighting control system of FIG. 2 according to aspects of the present disclosure.

FIG. 3 is a diagram illustrating additional details of the lighting control system of FIG. 2 according to aspects of the present disclosure. As illustrated in FIG. 3, light fixtures 230b, 230c, 230f, 230i, and 230l, and wall stations 235, 352, and 362 may be connected to the first network 210. Light fixtures 354a, 354b, 364a, 364b, 230a, 230d, 230e, 230g, 230h, 230j, and 230k may be connected to the second network 220. The light fixtures may include embedded occupancy sensors 232a-232l. Devices on the first network 210 and the second network 220 may be associated by the central controller 240.

In the example lighting installation shown in FIG. 3, lighting groups controlled by wall stations may be formed by commanding the devices in the lighting control system network(s) into a pairing mode. The devices may be commanded into the pairing mode using the control device, in this case the wall station that will control the lighting group. A technician may use a wall station to command the networked devices into pairing mode by, for example, a specified sequence of button presses, a selection on a touch screen display, a software application executing on a mobile device, or another method of interfacing with the wall station. The command entered via the wall station may be transmitted to the central controller 240, and the central controller may transmit signals to the devices to command them into the pairing mode. Other methods of commanding the devices into pairing mode with the first wall station may be used, for example a software application executing on a mobile device in communication with the first wall station, without departing from the scope of the present disclosure. In some implementations, a user may input commands to a user interface (not shown) of the central controller 202 to cause the central controller 240 to command the devices connected to a specified network into pairing mode.

When in pairing mode, sensitivity of the embedded sensors (e.g., occupancy sensors) in the devices (e.g., light fixtures) may be reduced such that motion of a person may be detected only in the immediate vicinity, for example directly beneath, a light fixture. In some implementations, wall stations may also include embedded sensors such as occupancy sensors. In these implementations, the sensitivity of the sensors may be reduced such that the motion of a person directly in front of the wall station may be detected. Devices (e.g., light fixtures and/or wall stations) to be associated with the lighting group may then be selected by an occupant, for example a technician performing the commissioning of the lighting control system, moving beneath the desired light fixtures and in front of desired wall stations. In cases where a wall station does not include a sensor, the wall station may be selected as part of the lighting group using one or more button presses, a selection on a touchscreen display, or other means of interfacing with the wall station. Pairing mode may be exited by a second specified sequence of button presses, a selection on a touch screen display of the wall station, or other means of interfacing with the wall station from which pairing mode was entered. For lighting installations in which devices for one lighting group are connected to more than one network, the central controller may enable the association of the devices on the different networks with the lighting group.

Referring to the example of FIG. 3, three lighting groups may be formed: a first lighting group for the first private office 250, a second lighting group for the second private office 260, and a third lighting group for the open office space 270. To form the first lighting group for the first private office 250, the technician may enter a specified sequence of button presses or a selection on a touch screen display of a first wall station 352 to command all the devices on the first network 210 and the second network 220 into pairing mode. For example, the specified sequence of button presses or a selection on the touch screen display on the first wall station 352 may transmit a signal to the central controller 240 indicating that the devices in the lighting control system should be commanded into pairing mode. A processor or embedded controller of the first wall station 352 may cause a communications unit of the first wall station 352 to transmit a signal to the central controller 240. The transmitted signal from the first wall station 352 may include a network address or other identifier of the first wall station 352. The central controller 240 may associate the network address or other identifier of the first wall station 352 with an identifier of a first lighting group and may issue commands to the devices via the first network 210 and the second network 220 to cause the devices to enter pairing mode.

Entering pairing mode may cause the sensitivity of the sensors embedded in the light fixtures and/or wall stations connected to both networks to be reduced. In addition, the light intensity emitted by the light fixtures may change to a different level (e.g., increase intensity, decrease intensity, blink, change color, or another visual indication) from its current level to indicate that the light fixtures are in pairing mode. For example, the central controller 240 may transmit a signal to the processor or controller in each light fixture to cause the processor or controller in the light fixture to decrease the light intensity. In the private office 250, the sensitivity of the sensors (e.g., occupancy sensors) 356a and 356b embedded in light fixtures 354a and 354b, respectively, may be reduced. The technician may then walk beneath light fixture 354a. The motion of the technician may be detected by the sensor 356a embedded in the light fixture 354a. Since the sensitivity of the sensors 356a and 356b is reduced in pairing mode, only the sensor 356a embedded in the light fixture 354a may detect the motion of the technician. Alternatively, the sensor may use the proximity of the technician to the fixture (if capable of determining distance) and a specified range based on the size and type of the fixture to determine when the technician is under the light fixture.

A signal indicating the detection may be transmitted to the central controller 240 from the light fixture 354a. For example, a processor or embedded controller of the light fixture 354a may cause a communications unit of the light fixture 354a to transmit a signal to the central controller 240. Based on the received signal, the central controller may associate the light fixture 354a with the first wall station 352 as part of the first lighting group. The detection signal may include an identifier (e.g., a network address or other identifier) of the light fixture 354a. The central controller 240 may associate network addresses or other identifiers of the first wall station 352 and the light fixture 354a with an identifier (e.g., an identification number) of the first lighting group.

When the light fixture 354a is associated with the first lighting group, the light intensity emitted by the light fixture 354a may change (e.g., increase intensity, decrease intensity, blink, change color, or another visual indication) from its current level to indicate the association. For example, the central controller 240 may transmit a signal to the processor or controller in the light fixture 354a to cause the processor or controller in the light fixture to increase the light intensity.

The technician may then walk beneath light fixture 354b. The motion of the technician may be detected by the sensor 356b embedded in the light fixture 354b. Since the sensitivity of the sensors 356a and 356b is reduced in pairing mode, only the sensor 356b embedded in the light fixture 354b may detect the motion of the technician. Alternatively, the sensor may use the proximity of the technician to the fixture (if capable of determining distance) and a specified range based on the size and type of the fixture to determine when the technician is under the light fixture. A signal indicating the detection may be transmitted to the central controller 240 from the light fixture 354b. For example, a processor or embedded controller of the light fixture 354b may cause a communications unit of the light fixture 354b to transmit a signal to the central controller 240. Based on the received signal, the central controller 240 may associate the light fixture 354b with the first wall station 352 as part of the first lighting group. The detection signal may include an identifier (e.g., a network address or other identifier) of the light fixture 364a. The central controller 240 may associate network addresses or other identifiers of the wall station 352 and the light fixture 354b with an identifier (e.g., an identification number) of the first lighting group.

When the light fixture 354b is associated with the first lighting group, the light intensity emitted by the light fixture 354b may change (e.g., increase intensity, decrease intensity, blink, change color, or another visual indication) from its current level to indicate the association. For example, the central controller 240 may transmit a signal to the processor or controller in the light fixture 354b to cause the processor or controller in the light fixture to increase the light intensity. The technician may then return to the first wall station 352 and enter a second specified sequence of button presses or a selection on a touch screen display or otherwise interact with the first wall station 352 to cause the first wall station 352 to transmit an exit signal to the central controller 240. The central controller 240 may transmit signals to the devices on the first network 210 and the second network 220 to cause the devices to exit the pairing mode. The signals transmitted by the central controller 240 may cause the embedded controller or processor of each light fixture to change (e.g., increase intensity, decrease intensity, blink, change color, or another visual indication) the light intensity levels of the light fixtures from their current levels upon exiting the pairing mode.

Once a device has been paired, it will not enter pairing mode again during the commissioning process unless the device receives a specified command issued from the central controller or associated wall station. Devices may be disassociated from their lighting groups, for example, by specified commands issued from the central controller or associated wall station and again be available for pairing.

A second lighting group for the second private office 260 may be formed by the technician entering a specified sequence of button presses or a selection on a touch screen display of a second wall station 362 to command all the devices on the first network 210 and the second network 220 into pairing mode. For example, the specified sequence of button presses or a selection on the touch screen display on the second wall station 362 may transmit a signal to the central controller 240 indicating that the devices in the lighting control system should be commanded into pairing mode. A processor or embedded controller of the second wall station 362 may cause a communications unit of the second wall station 362 to transmit a signal to the central controller 240. The transmitted signal from the second wall station 362 may include a network address or other identifier of the second wall station 362. The central controller 240 may associate the network address or other identifier of the second wall station 362 with a second lighting group and may issue commands to the devices via the first network 210 and the second network 220 to cause the devices to enter pairing mode. As noted above, the first wall station 352 and the light fixtures 354a and 354b will not enter pairing mode since they have already been paired.

Entering pairing mode may cause the sensitivity of the sensors embedded in the light fixtures and/or wall stations connected to both networks to be reduced. In addition, the light intensity emitted by the light fixtures may change to a different level (e.g., increase intensity, decrease intensity, blink, change color, or another visual indication) from its current level to indicate that the light fixtures are in pairing mode. In the private office 260, the sensitivity of the sensors (e.g., occupancy sensors) 366a and 366b embedded in light fixtures 364a and 364b, respectively, may be reduced. The technician may then walk beneath light fixture 364a. The motion of the technician may be detected by the sensor 366a embedded in the light fixture 364a. Since the sensitivity of the sensors 366a and 366b is reduced in pairing mode, only the sensor 366a embedded in the light fixture 364a may detect the motion of the technician. Alternatively, the sensor may use the proximity of the technician to the fixture (if capable of determining distance) and a specified range based on the size and type of the fixture to determine when the technician is under the light fixture.

A signal indicating the detection may be transmitted to the central controller 240 from the light fixture 364a. For example, a processor or embedded controller of the light fixture 364a may cause a communications unit of the light fixture 364a to transmit a signal to the central controller 240. Based on the received signal, the central controller may associate the light fixture 364a with the second wall station 362 as part of the second lighting group. The detection signal may include an identifier (e.g., a network address or other identifier) of the light fixture 364a. The central controller 240 may associate network addresses or other identifiers of the second wall station 362 and the light fixture 364b with an identifier (e.g., an identification number) of the second lighting group. When the light fixture 364a is associated with the second lighting group, the light intensity emitted by the light fixture 364a may change to a different level (e.g., increase intensity, decrease intensity, blink, change color, or another visual indication) from its current level to indicate the association. For example, the central controller 240 may transmit a signal to the processor or controller in the light fixture 364a to cause the processor or controller in the light fixture to increase the light intensity.

The technician may then walk beneath light fixture 364b. The motion of the technician may be detected by the sensor 366b embedded in the light fixture 364b. Since the sensitivity of the sensors 366a and 366b is reduced in pairing mode, only the sensor 366b embedded in the light fixture 364b may detect the motion of the technician. Alternatively, the sensor may use the proximity of the technician to the fixture (if capable of determining distance) and a specified range based on the size and type of the fixture to determine when the technician is under the light fixture. A signal indicating the detection may be transmitted to the central controller 240 from the light fixture 364b. For example, a processor or embedded controller of the light fixture 364b may cause a communications unit of the light fixture 364b to transmit a signal to the central controller 240. Based on the received signal, the central controller may associate the light fixture 364b with the wall station 362 as part of the first lighting group. The detection signal may include an identifier (e.g., a network address or other identifier) of the light fixture 364b. The central controller 240 may associate network addresses or other identifiers of the second wall station 362 and the light fixture 364b with an identifier (e.g., an identification number) of the second lighting group.

When the light fixture 364b is associated with the second lighting group, the light intensity emitted by the light fixture 364b may change to a different level (e.g., increase intensity, decrease intensity, blink, change color, or another visual indication) from its current level to indicate the association. For example, the central controller 240 may transmit a signal to the processor or controller in the light fixture 364b to cause the processor or controller in the light fixture to increase the light intensity. The technician may then return to the second wall station 362 and enter a second specified sequence of button presses or a selection on a touch screen display or otherwise interact with the second wall station 362 to cause the second wall station 362 to transmit an exit signal to the central controller 240. The central controller 240 may transmit signals to the devices on the first network 210 and the second network 220 to cause the devices to exit the pairing mode. The signals transmitted by the central controller 240 may cause the embedded controller or processor of each light fixture to change the light intensity levels of the light fixtures to different levels (e.g., increase intensity, decrease intensity, blink, change color, or another visual indication) from their current levels upon exiting the pairing mode.

A third lighting group for the open office space 270 may be formed by the technician entering a specified sequence of button presses or a selection on a touch screen display of a third wall station 235 to command all the devices on the first network 210 and the second network 220 into pairing mode. For example, the specified sequence of button presses or a selection on the touch screen display on the third wall station 235 may transmit a signal to the central controller 240 indicating that the devices in the lighting control system should be commanded into pairing mode. A processor or embedded controller of the third wall station 235 may cause a communications unit of the third wall station 235 to transmit a signal to the central controller 240. The transmitted signal from the third wall station 235 may include a network address or other identifier of the third wall station 235. The central controller 240 may associate the network address or other identifier of the third wall station 235 with a third lighting group and may issue commands to the devices via the first network 210 and the second network 220 to cause the devices to enter pairing mode. As noted above, the first wall station 352, the second wall station 362, and the light fixtures 354a, 354b, 364a, and 364b will not enter pairing mode since they have already been paired.

Entering pairing mode may cause the sensitivity of the sensors embedded in the light fixtures and/or wall stations connected to both networks to be reduced. In addition, the light intensity emitted by the light fixtures may change to different levels (e.g., increase intensity, decrease intensity, blink, change color, or another visual indication) from their current levels to indicate that the light fixtures are in pairing mode. In the open office space 270, the sensitivity of the sensors (e.g., occupancy sensors) 332a-332l embedded in light fixtures 330a-330l, respectively, may be reduced. The technician may then walk beneath each light fixture 330a-330l. The motion of the technician may be detected by the sensors 332a-332l embedded in the light fixtures 330a-330l as the technician passes beneath each light fixture 330a-330l. Since the sensitivity of the sensors 332a-332l is reduced in pairing mode, only the sensor embedded in the light fixture beneath which the technician passes may detect the motion of the technician. Alternatively, the sensors may use the proximity of the technician to the fixture (if capable of determining distance) and a specified range based on the size and type of the fixture to determine when the technician is under the light fixtures.

A signal indicating the detection may be transmitted from each of the light fixtures 330a-330l to the central controller 240. Processors or embedded controllers of each of the light fixtures 330a-330l may cause respective communications units to transmit signals to the central controller 240. Based on the received signals, the central controller may associate each of the light fixtures 330a-330l with the third wall station 235 as part of the third lighting group. The detection signals may include identifiers (e.g., network addresses or other identifier) of the light fixtures 330a-330l. The central controller 240 may associate network addresses or other identifiers of the third wall station 235 and the light fixtures 330a-330l with an identifier (e.g., an identification number) of the third lighting group. As the light fixtures 330a-330l are associated with the third lighting group, the light intensity emitted by each light fixture 330a-330l may change to a different level (e.g., increase intensity, decrease intensity, blink, change color, or another visual indication) from its current level to indicate the association. For example, the central controller 240 may transmit a signal to the processor or controller in each light fixture 330a-330l to cause the processor or controller in the light fixture to increase the light intensity.

The technician may then return to the third wall station 235 and enter a second specified sequence of button presses or a selection on a touch screen display or otherwise interact with the third wall station 235 to cause the third wall station 235 to transmit an exit signal to the central controller 240. The central controller 240 may transmit signals to the devices on the first network 210 and the second network 220 to cause the devices to exit the pairing mode. The signals transmitted by the central controller 240 may cause the embedded controller or processor of each light fixture to change the light intensity levels of the light fixtures to different levels (e.g., increase intensity, decrease intensity, blink, change color, or another visual indication) from their current levels upon exiting the pairing mode.

While the above example is explained using three lighting groups, it should be appreciated that any number of lighting groups may be formed during commissioning of a lighting control system as explained by the example without departing from the scope of the present disclosure.

In some embodiments, a lighting control system implemented with a centralized architecture may use a centralized occupancy sensor rather than distributed sensors embedded in the light fixtures. A centralized occupancy sensor, for example, an ultrasonic sensor, a high-frequency radio frequency (RF) sensor, etc., may be mounted on a wall or ceiling to sense motion for multiple light fixtures, for example all the light fixtures in one room. The centralized occupancy sensor may be a "directionally aware" sensor. A directionally aware sensor may be capable of determining a direction and/or location from which motion is detected and may enable multiple lighting groups to be defined within a large space using the one occupancy sensor for each lighting group. The centralized occupancy sensor may sense motion in the room around each of the light fixtures and provide a motion detection signal to the central controller.

A directionally aware centralized occupancy sensor can differentiate between the location of motion occurring in the room in which it is mounted and motion that is not occurring in the room. For example, high-frequency RF sensors (e.g., ultra-wideband (UWB), time-of-flight (TOF), etc.) have some ability to penetrate walls, but also provide low resolution images of objects within its field of view enabling the use of signal processing to detect the location of objects such as light fixtures as well as to detect where motion occurs. Ultrasonic sensors may also determine a location of motion within a room.

Figure 4:
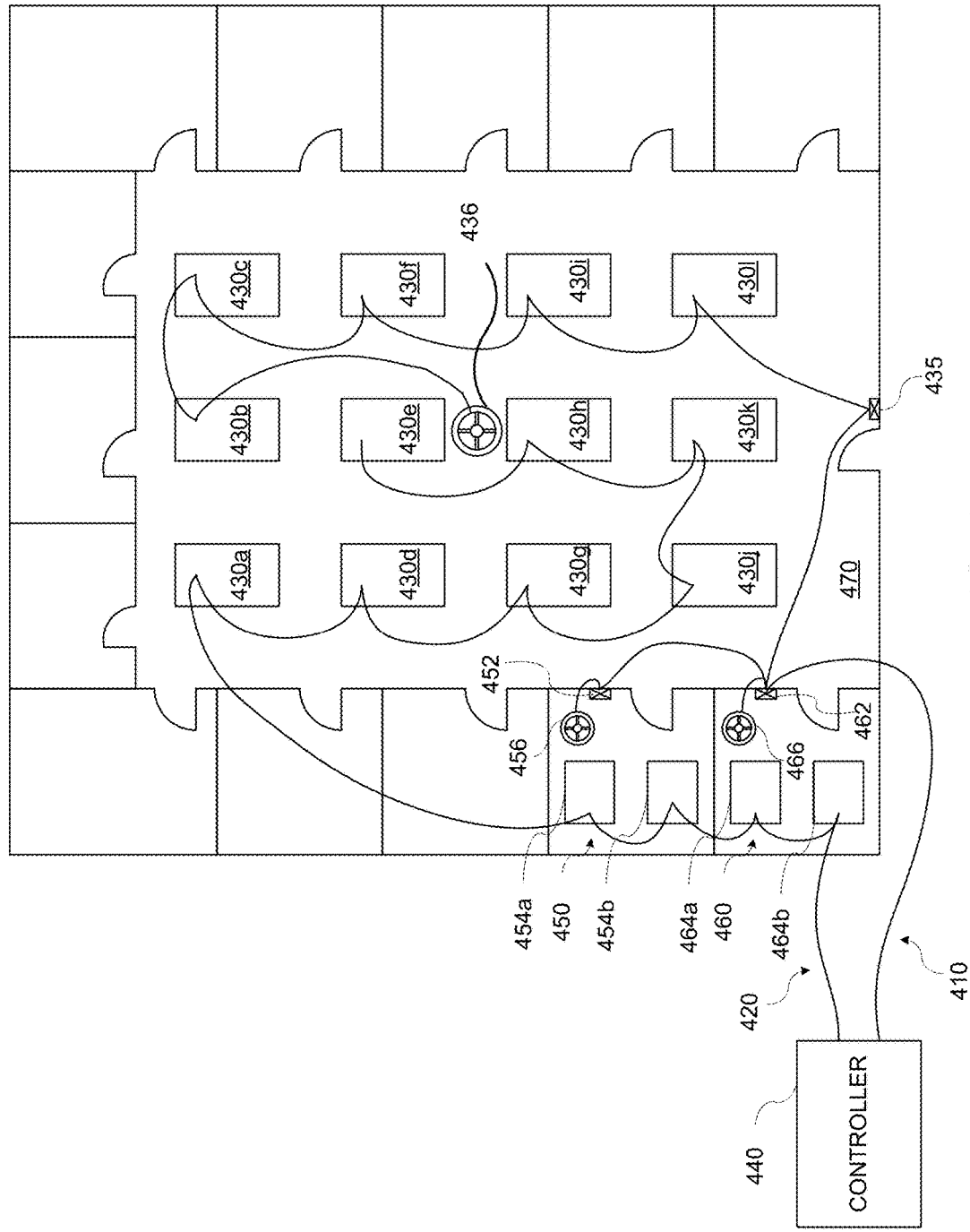
FIG. 4 is a diagram illustrating an example of a lighting control system having a centralized architecture and using centralized sensors according to aspects of the present disclosure.

FIG. 4 is a diagram illustrating an example of a lighting control system 400 having a centralized architecture and using centralized sensors according to aspects of the present disclosure. As shown in FIG. 4, the lighting control system 400 is similar to the lighting control system 300 illustrated in FIG. 3, with the exception that the occupancy sensors are centralized to sense motion around multiple light fixtures. Referring to FIG. 4, the centralized occupancy sensor 436 may sense motion around the light fixtures 430a-430l in the open office space 470, the centralized occupancy sensor 456 may sense motion around the light fixtures 454a and 454b in the private office 450, and the centralized occupancy sensor 466 may sense motion around the light fixtures 464a and 464b in the private office 460. The centralized occupancy sensors 436, 456, and 466 may be mounted on a wall or ceiling and may be connected to the network 410.

Each centralized occupancy sensor 436, 456, and 466 may include a processor or controller, a communications unit, and a memory. The communications unit may enable the occupancy sensor to communicate via a wired or wireless network. The communication unit may represent one or more components that facilitate a network connection. As in the lighting control system 300 shown in FIG. 3, devices on multiple networks (e.g., the networks 410 and 410) may be associated via the central controller 440. The central controller 440 may function in the same manner as the central controller 240.

The lighting control system 400 using centralized sensors may be commissioned in a similar manner as the lighting control 300 system using distributed sensors. For example, a first lighting group may be formed for the private office 450 by first commanding the devices in the lighting control system 400 into a pairing mode. A technician may use the wall station 452 to transmit a signal to the central controller 440 indicating that the devices in the lighting control system should be commanded into pairing mode. The transmitted signal from the wall station 452 may include a network address or other identifier of the wall station 452. The central controller 440 may associate the network address or other identifier of the wall station 452 with a first lighting group and may issue commands to the devices via the first network 410 and the second network 420 to cause the devices to enter pairing mode.

Entering pairing mode may cause the sensitivity of the centralized occupancy sensors 436, 456, and 466 to be reduced such that motion outside the space monitored by the centralized occupancy sensors may not be detected. The central controller 240 may transmit a signal to the processor or controller in each light fixture to cause the processor or controller in the light fixture to change the light intensity to a different level (e.g., increase intensity, decrease intensity, blink, change color, or another visual indication) from its current level upon entering pairing mode. As the technician walks under each of the light fixtures 454a and 454b, the centralized occupancy sensor 456 may sense the motion. The centralized occupancy sensor 456 may sense the motion under the light fixture 454a and transmit a detection signal to the central controller 440 identifying the light fixture 454a as a light fixture to be associated with the first lighting group. Signal processing by the embedded controller, or the central controller in a system including a central controller, may correlate the location of the detected motion with the position of a lighting fixture or wall station. After receiving the signal from the centralized occupancy sensor 456, the central controller 440 may associate a network address or other identifier of the light fixture 454a with an identifier (e.g., an identification number) of the first lighting group. The central controller 440 may transmit another signal to cause the processor or controller in the light fixture 454a to change the light intensity to a different level (e.g., increase intensity, decrease intensity, blink, change color, or another visual indication) from its current level when the light fixture is associated with the lighting group.

The centralized occupancy sensor 456 may also sense the motion under the light fixture 454b and transmit a detection signal to the central controller 440 identifying the light fixture 454b as being associated with the first lighting group. After receiving the signal from the centralized occupancy sensor 456, the central controller 440 may associate a network address or other identifier of the light fixtures 454b with an identifier (e.g., an identification number) of the first lighting group. The central controller 440 may transmit another signal to cause the processor or controller in the light fixture 454b to change the light intensity to a different level (e.g., increase intensity, decrease intensity, blink, change color, or another visual indication) from its current level when the light fixture is associated with the lighting group.

Similarly, the technician may cause the central controller 440 to command the lighting control system 400 into pairing mode with wall station 462 to associate light fixtures 464a and 464b with a second lighting group by walking beneath the light fixtures and having the motion sensed by the centralized occupancy sensor 466. The technician may also cause the central controller 440 to command the lighting control system 400 into pairing mode with wall station 435 to associate light fixtures 430a-430l with a third lighting group by walking beneath the light fixtures and having the motion sensed by the centralized occupancy sensor 436.

According to aspects of the present disclosure, the central controller may maintain a record of the associations of light fixtures and wall stations with lighting groups. For example, the central controller may store in a data structure (e.g., a list or table) in memory the associations of lighting group identifiers with network addresses or other identifiers of the devices. Alternatively or additionally, the data structure may be stored in each of the devices.

Figure 5:
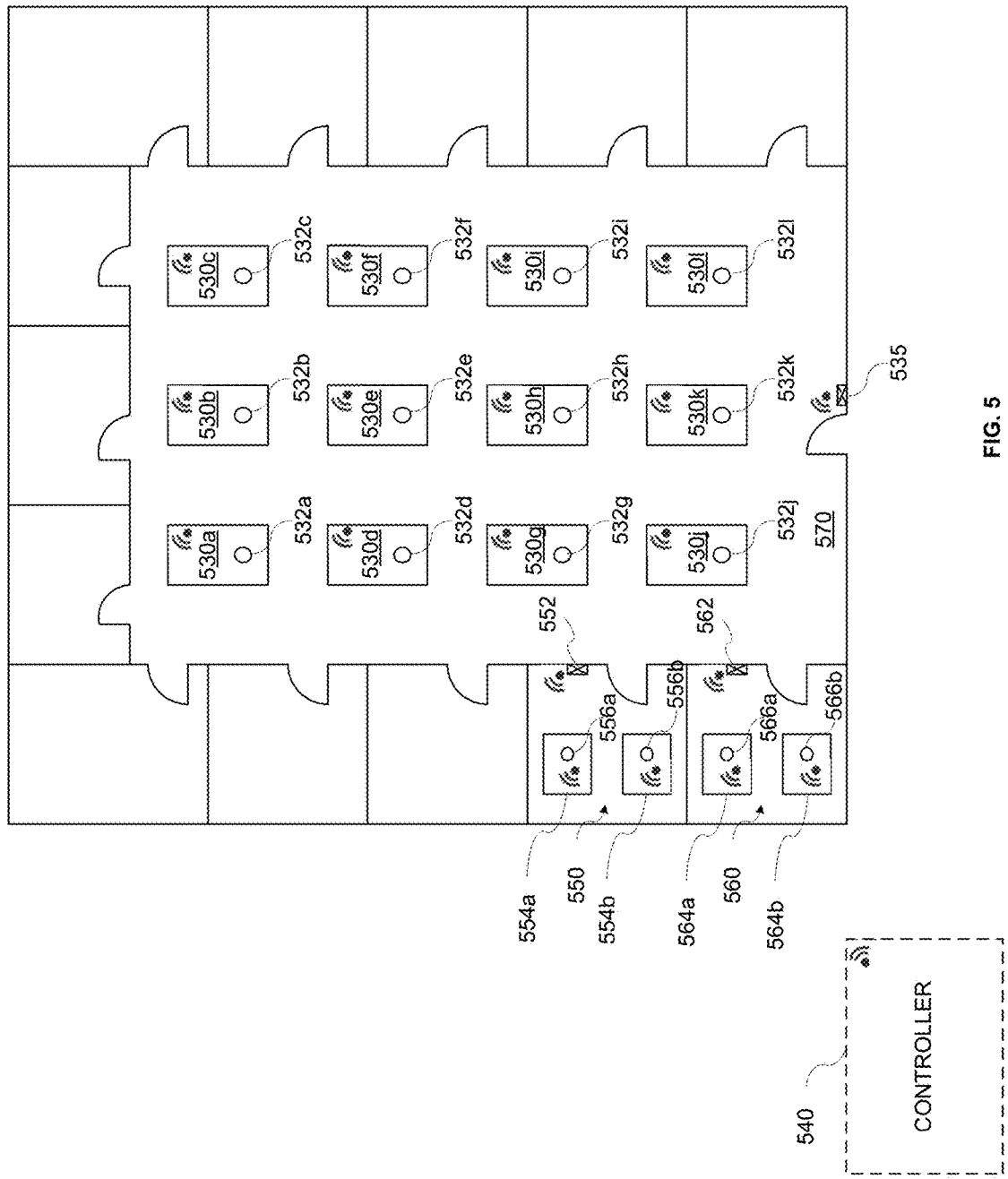
FIG. 5 is a diagram illustrating an example of a lighting control system having a distributed architecture and using distributed sensors according to aspects of the present disclosure.

In some embodiments, a lighting control system may be implemented with a wireless distributed architecture. In accordance with aspects of the present disclosure, wireless lighting control systems may be commissioned in a manner similar to the wired lighting control systems. FIG. 5 is a diagram illustrating an example of a lighting control system 500 having a wireless distributed architecture and using distributed sensors according to aspects of the present disclosure. In a distributed architecture, each device (e.g., wall station, light fixture, etc.) can include an embedded controller or processor. Each device may include a wireless communication unit (e.g., the communication unit 135 or the communication unit 160) and may communicate with other devices to form a wireless network. Each device may have a network address or other identifier to identify the device on the network. Referring to FIG. 5, sensors 532a-532l (e.g., occupancy sensors) may be distributed in the light fixtures 530a-530l, with each light fixture 530a-530l having its own embedded occupancy sensor 532a-532l to detect motion in the vicinity of the light fixture 530a-530l and provide a motion detection signal to the embedded controllers in the light fixtures. For example, when the embedded occupancy sensor 532a-532l detects motion of a person near the light fixture 530a-530l, the embedded occupancy sensor 532a-532l may generate a signal to the embedded controller or processor (e.g., the controller or processor 105) of the light fixture 530a-530l.

With wireless lighting control systems, the lighting groups can be formed by wireless communication between the devices on the wireless network. Each individual wireless device (e.g., light fixture, wall station, etc.) can be associated with a particular lighting group based on for example, an IP address, MAC address, or other network address or identifier, by responding to a broadcast message from one of the devices. To form a lighting group, a technician may operate a wall station to cause the wireless devices in the lighting installation to enter a pairing mode. The technician may input a command to the wall station by, for example, a specified sequence of button presses, a selection on a touch screen display, a software application executing on a mobile device, or another method of interfacing with the wall station. An embedded controller or processor in a wall station may cause a message to be wirelessly broadcast to the light fixtures and other wall stations on the wireless network of the wireless lighting control system. Devices on the wireless network may then be selected to be associated with a lighting group formed with the broadcasting wall station.

Referring again to the example of FIG. 5, during commissioning, a lighting group may be formed for the open office space 570 controlled by the wall station 535. The wall station 535 may act as a primary controller for the lighting group. The technician may input a command to the wall station 535 by, for example, a specified sequence of button presses, a selection on a touch screen display, a software application executing on a mobile device, or another method of interfacing with the wall station 535. The embedded controller or processor in the wall station 535 may cause the communications unit to wirelessly broadcast a message to the light fixtures and other wall stations on the wireless network. The message may include an identifier (e.g., an identification number) of the lighting group associated with the wall station 535. Each of the devices on the wireless network that has not already been paired may receive the broadcast message from the wall station 535 and may enter a pairing mode.

When in pairing mode, sensitivity of the embedded sensors (e.g., occupancy sensors) in the devices (e.g., light fixtures) may be reduced such that motion of a person may be detected only in the immediate vicinity, for example directly beneath, a light fixture. In addition, the light intensity emitted by the light fixtures may change to different levels (e.g., increase intensity, decrease intensity, blink, change color, or another visual indication) from their current levels to indicate that the light fixtures are in pairing mode. In some implementations, wall stations may also include embedded sensors such as occupancy sensors. In these implementations, the sensitivity of the sensors may be reduced such that the motion of a person directly in front of the wall station may be detected.

While in pairing mode, the technician may walk beneath each light fixture 530a-530l and/or near each additional wall station to be included in the lighting group. Since the sensitivity of the sensors embedded in the light fixtures is reduced in pairing mode, only the sensor (e.g., occupancy sensor 532a-532l) embedded in the light fixture (e.g., light fixture 530a-530l) under which the technician is walking may detect the motion of the technician. Alternatively, the sensor may use the proximity of the technician to the fixture (if capable of determining distance) and a specified range based on the size and type of the fixture to determine when the technician is under the light fixture. A signal indicating the detection may be transmitted from the embedded occupancy sensor 532a-532l to the embedded controller or processor of the light fixture 530a-530l. Based on the received signal, the embedded controller or processor of the light fixture 530a-530l may associate the light fixture 530a-530l with the wall station 535 as part of the lighting group. The embedded controller or processor of the light fixture 530a-530l may cause a signal to be transmitted to the wall station 535 indicating that the light fixture 530a-530l has been associated with the lighting group.

The embedded controller or processor of the light fixture 530a-530l may cause the association to be stored in a memory of the light fixture. For example, a lighting group identifier and an identifier (e.g., a network address or other identifier) of the wall station acting as the primary controller of the lighting group, as well as identifiers of other devices associated with the lighting group, may be stored in a data structure (e.g., a list or table) in memory of the light fixture. Additionally or alternatively, the data structure may be stored in the memory of the wall station. In some implementations, the data structure may be stored only in the memory of the wall station. When the light fixture 530a-530l is associated with the lighting group, the light intensity emitted by the light fixture 530a-530l may change to a different level (e.g., increase intensity, decrease intensity, blink, change color, or another visual indication) from its current levels to indicate the association. For example, the embedded controller or processor of the light fixture 530a-530l may cause the light fixture to increase the light intensity. While in pairing mode, the technician may walk beneath each light fixture in the open office space 570 to cause each of the light fixtures to be associated with the lighting group controlled by the wall station 535.

After all the devices to be associated with the lighting group have been selected, the technician may then return to the wall station 535 and enter a second specified sequence of button presses or a selection on a touch screen display or otherwise interact with the wall station 535 to cause the wall station 535 to transmit an exit signal to the devices on the wireless network. The embedded controller of the wall station 535 may transmit signals to the devices on the wireless network to cause the devices to exit the pairing mode. Upon exiting the pairing mode, the embedded controller or processor of each light fixture may cause the light fixtures to change their light intensity levels to different levels (e.g., increase intensity, decrease intensity, blink, change color, or another visual indication) from their current levels. Once a device has been paired, it will not enter pairing mode again during the commissioning process. Devices may be disassociated from their lighting groups, for example, by special commands issued from the embedded controller of the wall station controlling the lighting group, and again be available for pairing.

Lighting groups for private offices 550 and 560 may be similarly formed. The technician may put the lighting control system into pairing mode using wall station 552, and walk beneath light fixtures light fixtures 554a and 554b. When the occupancy sensors 556a and 556b sense the motion of the technician beneath the respective light fixtures 554a and 554b, the light fixtures 554a and 554b may be associated with the wall station 552 as described above. The technician may cause the lighting control system to exit the pairing mode using wall station 552. The technician may again put the lighting control system into pairing mode using wall station 566 and walk beneath light fixtures light fixtures 564*a* and 564*b* to pair the light fixtures with the wall station 562 and exiting the pairing mode using wall station 566. Similarly, a lighting group including wall station 562 and light fixtures 564*a* and 564*b* may be formed by sensing the motion of the technician beneath light fixtures 564*a* and 564*b* by occupancy sensors 566*a* and 566*b*. The embedded controller or processor of the light fixtures 554*a*, 554*b*, 564*a*, and 564*b* may cause a signal to be transmitted to the wall stations 552 and 562, respectively, indicating that the light fixtures have been associated with the respective lighting groups.

In some embodiments, the embedded controllers or processors in each of the wireless devices may optionally communicate with a wireless central controller 540. The wireless central controller 540 may communicate with the wireless devices to perform functions similar to the central controller (e.g., the central controller 240) in the wired lighting control system embodiments explained above.

In some embodiments, a lighting control system implemented with a centralized architecture may use a centralized occupancy sensor rather than distributed sensors embedded in the light fixtures. A centralized occupancy sensor, for example, an ultrasonic sensor, a high-frequency radio frequency (RF) sensor, etc., may be used to sense motion for multiple light fixtures, for example all the light fixtures in one room. The centralized occupancy sensor may be a "directionally aware" sensor capable of determining a direction from which motion is detected. A directionally aware centralized occupancy sensor may enable multiple lighting zones to be defined within a large space using the one occupancy sensor. The centralized occupancy sensor may sense motion in the room around each of the light fixtures and provide a motion detection signal to the central controller.

A directionally aware centralized occupancy sensors can differentiate between motion occurring in the room in which it is mounted and motion that is not occurring in the room. For example, high-frequency RF sensors (e.g., ultra-wide-band (UWB), time-of-flight (TOF), etc.) have some ability to penetrate walls, but provides low resolution images of objects within its field of view enabling the use of signal processing to detect the location of objects such as light fixtures as well as to detect where motion occurs. Ultrasonic sensors may also determine a location of motion within a room.

Figure 6:
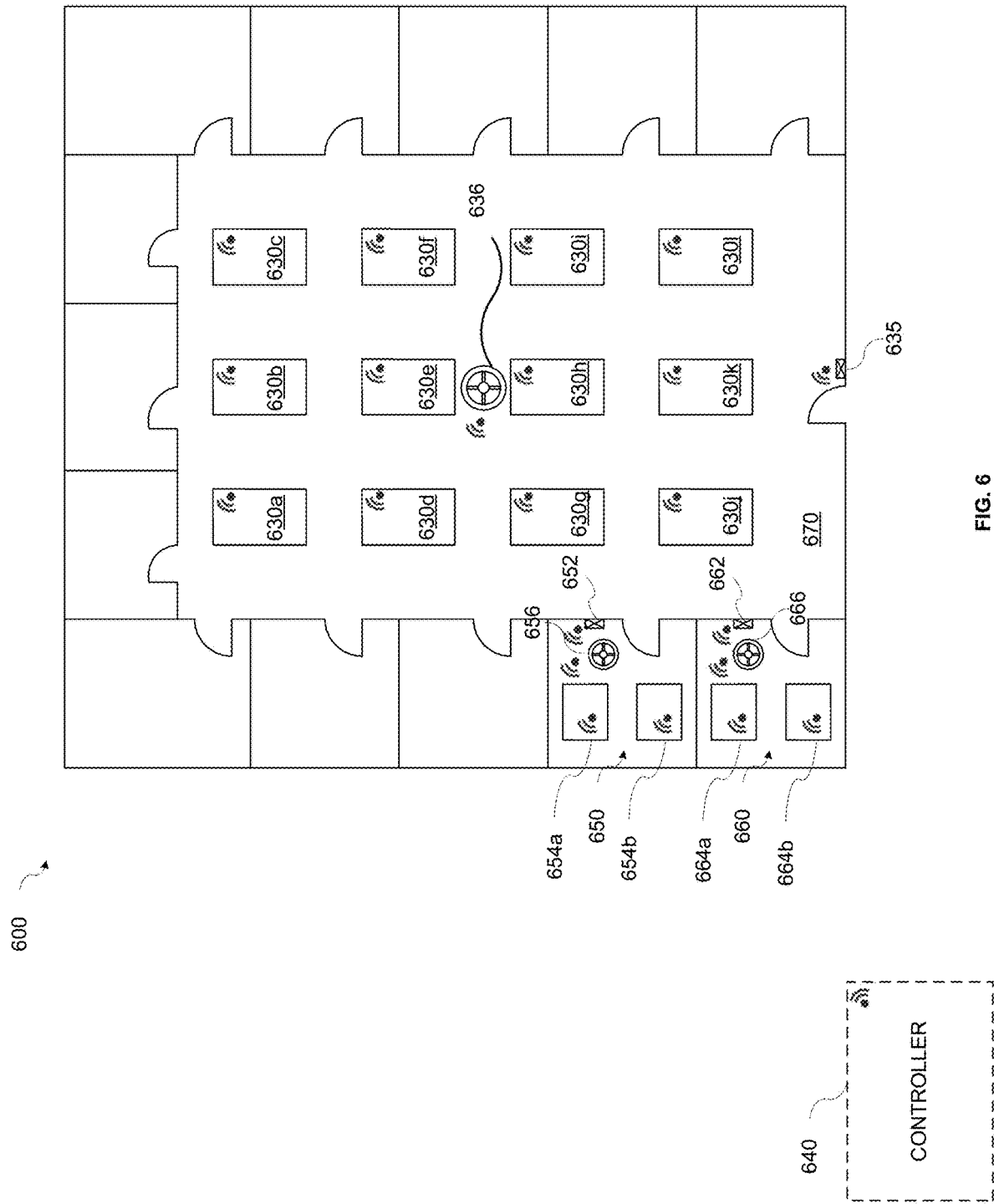
FIG. 6 is a diagram illustrating an example of a lighting control system having a distributed architecture and using centralized sensors according to aspects of the present disclosure.

FIG. 6 is a diagram illustrating an example of a lighting control system 600 having a distributed architecture and using centralized sensors according to aspects of the present disclosure. As shown in FIG. 6, the lighting control system 600 is similar to the lighting control system 500 illustrated in FIG. 5, with the exception that the occupancy sensors are centralized to sense motion around multiple light fixtures. Referring to FIG. 6, the centralized occupancy sensor 636 may sense motion around the light fixtures 630*a*-630*l* in the open office space 670, the centralized occupancy sensor 656 may sense motion around the light fixtures 654*a* and 654*b* in the private office 650, and the centralized occupancy sensor 666 may sense motion around the light fixtures 664*a* and 664*b* in the private office 660.

In a distributed architecture, each device (e.g., wall station, light fixture, sensor, etc.) can include an embedded controller or processor. Each device may include a wireless communication unit (e.g., the communication unit 135 or the communication unit 160) and may communicate with other devices to form a wireless network. Each device may have a network address or other identifier to identify the device on the network. Referring to FIG. 6, centralized occupancy sensors 636, 656, and 666 may be connected to a wireless network formed by the wireless wall stations, light fixtures, and sensors. Each centralized occupancy sensor 636, 656, and 666 may include a processor or controller, a communications unit, and a memory. The communications unit may enable the occupancy sensor to communicate via a wired or wireless network. The communication unit may represent one or more components that facilitate a wireless network connection. The centralized occupancy sensors 636, 656, and 666 may detect motion in the vicinity of the light fixtures and generate motion detection signal to the embedded controllers of the light fixtures. For example, when the embedded occupancy sensor 636 detects motion of a person near one of light fixtures 630*a*-630*l*, the occupancy sensor 636 can generate a signal to the embedded controller or processor (e.g., the controller or processor 105) of the light fixture 630*a*-630*l* corresponding to the detected motion.

The lighting control system 600 using centralized sensors may be commissioned in a similar manner as the lighting control 500 system using distributed sensors. For example, during commissioning, a lighting group may be formed for the open office space 670 controlled by the wall station 635. The wall station 635 may act as a primary controller for the lighting group. The technician may input a command to the wall station 635 by, for example, a specified sequence of button presses, a selection on a touch screen display, a software application executing on a mobile device, or another method of interfacing with the wall station 635. The embedded controller or processor in the wall station 635 may cause the communications unit to wirelessly broadcast a message to the light fixtures and other wall stations on the wireless network. The message may include an identifier (e.g., an identification number) of the lighting group associated with the wall station 635. Each of the devices on the wireless network that has not already been paired may receive the broadcast message from the wall station 635 and may enter a pairing mode.

When in pairing mode, sensitivity of the centralized sensors (e.g., occupancy sensors) may be reduced such that motion such that motion outside the space monitored by the centralized occupancy sensors may not be detected. In addition, the embedded controllers in the light fixtures may cause the light intensity emitted by the light fixtures to change to different levels (e.g., increase intensity, decrease intensity, blink, change color, or another visual indication) from their current levels to indicate that the light fixtures are in pairing mode. In some implementations, wall stations may also include embedded sensors such as occupancy sensors. In these implementations, the sensitivity of the sensors may be reduced such that the motion of a person directly in front of the wall station may be detected.

While in pairing mode, the technician may walk beneath each light fixture 630*a*-630*l* and/or additional wall station to be included in the lighting group. As the technician walks under each of the light fixtures 630*a*-630*l*, the centralized occupancy sensor 636 may sense the motion and transmit a detection signal to the appropriate light fixture. For example, as the technician walks beneath light fixture 630*a*, the centralized occupancy sensor 636 may sense the motion and transmit a detection signal to the embedded controller of the light fixture 630*a* identifying the light fixture 630*a* as a light fixture to be associated with the lighting group. Signal processing by the embedded controller, or the central controller in a system including a central controller, may correlate the location of the detected motion with the position of a lighting fixture or wall station. After receiving the signal from the centralized occupancy sensor 636, the embedded controller of the light fixture 630*a* may associate a network address or other identifier of the light fixture 630*a* with an identifier (e.g., an identification number) of the lighting group. The embedded controller may cause the light fixture 630*a* to change the light intensity to a different level (e.g., increase intensity, decrease intensity, blink, change color, or another visual indication) from its current level when the light fixture is associated with the lighting group.

The technician may then return to the wall station 635 and enter a second specified sequence of button presses or a selection on a touch screen display or otherwise interact with the wall station 635 to cause the wall station 635 to transmit an exit signal to the devices on the wireless network. The embedded controller of the wall station 635 may transmit signals to the devices on the wireless network to cause the devices to exit the pairing mode. Upon exiting the pairing mode, the embedded controller or processor of each light fixture may cause the light fixtures to change their light intensity levels to different levels (e.g., increase intensity, decrease intensity, blink, change color, or another visual indication) from their current levels. Once a device has been paired, it will not enter pairing mode again during the commissioning process. Devices may be disassociated from their lighting groups, for example, by special commands issued from the embedded controller of the wall station controlling the lighting group, and again be available for pairing.

Lighting groups for private offices 650 and 660 may be similarly formed. The technician may put the lighting control system into pairing mode using wall station 652, and walk beneath light fixtures light fixtures 654*a* and 654*b*. When the occupancy sensor 656 senses the motion of the technician beneath the respective light fixtures 654*a* and 654*b*, the light fixtures 654*a* and 654*b* may be associated with the wall station 652 as described above. The technician may cause the lighting control system to exit the pairing mode using wall station 652. The technician may again put the lighting control system into pairing mode using wall station 662 and walk beneath light fixtures light fixtures 664*a* and 664*b* to pair the light fixtures with the wall station 662 and exiting the pairing mode using wall station 662. Similarly, a lighting group including wall station 662 and light fixtures 664*a* and 664*b* may be formed by sensing the motion of the technician beneath light fixtures 664*a* and 664*b* by occupancy sensor 666.

In some embodiments, the embedded controllers or processors in each of the wireless devices may optionally communicate with a wireless central controller 640. The wireless central controller 640 may communicate with the wireless devices to perform functions similar to the central controller (e.g., the central controller 440) in the wired lighting control system embodiments explained above.

Figure 7:
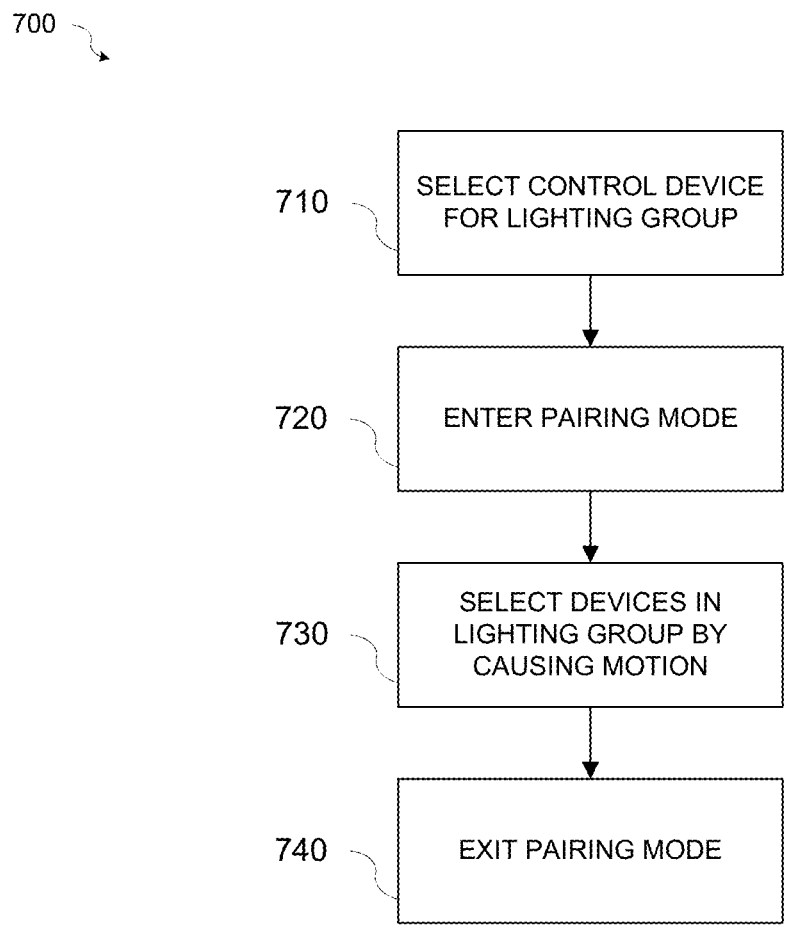
FIG. 7 is a flowchart illustrating an example of a method for commissioning a lighting control system according to aspects of the present disclosure.

FIG. 7 is a flowchart illustrating an example of a method 700 for commissioning a lighting control system according to aspects of the present disclosure. The lighting control system may form a wired or wireless network of devices (e.g., light fixtures, wall stations, sensors, etc.). At block 710, a control device for the lighting group may be selected. For example, a wall station may be selected to provide control functions, for example, but not limited to, on-off switching, dimming, etc., for light fixtures in a lighting group of the lighting control system for a selected space. The wall station may include an embedded controller or processor and/or may communicate wirelessly or over a wired connection via a communication unit with a central lighting controller and/or light fixtures and/or sensors in a lighting group. The wall station may include a user interface, for example, one or more buttons and/or a touch screen, to enable a user to input commands for controlling a lighting group. In some implementations, a software application, for example an application executing on a mobile device, may be operable to communicate with the wall station to input commands to the wall station. In some implementations, the wall station may include one or more sensors, for example, but not limited to, occupancy sensors, light sensors, etc. Each lighting group formed in the lighting control system may include one or more wall stations.

At block 720, pairing mode may be entered. The selected control device may be used to command the devices in the lighting control system into a pairing mode. A technician may use the wall station to command the networked devices into pairing mode by, for example, a specified sequence of button presses, a selection on a touch screen display, a software application executing on a mobile device, or another method of interfacing with the wall station. The command entered via the wall station may be transmitted to the central controller, and the central controller may transmit signals to the devices to command them into the pairing mode. Alternatively, in a lighting control system without a central controller (e.g., in a wireless lighting control system), an embedded controller or processor in the wall station may cause a message to be wirelessly broadcast to the light fixtures and other wall stations on the wireless network of the wireless lighting control system to enter the pairing mode.

When in pairing mode, sensitivity of the embedded sensors (e.g., occupancy sensors) in the devices (e.g., light fixtures) may be reduced such that motion of a person may be detected only in the immediate vicinity, for example directly beneath, a light fixture. In addition, the light intensity emitted by the light fixtures may change to different levels (e.g., increase intensity, decrease intensity, blink, change color, or another visual indication) from their current levels to indicate that the light fixtures are in pairing mode. In some implementations, wall stations may also include embedded sensors such as occupancy sensors. In these implementations, the sensitivity of the sensors may be reduced such that the motion of a person directly in front of the wall station may be detected. Devices on the wireless network may then be selected to be associated with a lighting group formed with the broadcasting wall station.

At block 730, devices to be included in the lighting group may be selected by causing motion in the vicinity of the selected devices. While in pairing mode, the technician may walk beneath each light fixture and/or near each additional wall station to be included in the lighting group. Since the sensitivity of the sensors is reduced in pairing mode, the sensors may detect the motion of the technician in the vicinity of a light fixture or wall station. For example, an occupancy sensor embedded in a light fixture may sense the motion of a technician walking beneath the light fixture. Alternatively, the sensor may use the proximity of the technician to the fixture (if capable of determining distance) and a specified range based on the size and type of the fixture to determine when the technician is under the light fixture. A signal indicating the detection may be transmitted from the embedded occupancy sensor to the embedded controller or processor of the light fixture, or to a central controller in a system that includes a central controller. Based on the received signal, the embedded controller or processor of the light fixture (or central controller) may associate the light fixture with the wall station as part of the lighting group.

Alternatively, a directionally aware centralized occupancy sensor may sense motion as the technician walks beneath the light fixtures and transmit a detection signal to the embedded controller of the light fixture, or the central controller in a system including a central controller, identifying the light fixture as a light fixture to be associated with the lighting group. Signal processing by the embedded controller (or the central controller) may correlate the location of the detected motion with the position of a lighting fixture or wall station. After receiving the signal from the centralized occupancy sensor, the embedded controller of the light fixture (or the central controller) may associate a network address or other identifier of the light fixture with an identifier (e.g., an identification number) of the lighting group. The embedded controller (or the central controller) may cause the light fixture to change the light intensity to a different level (e.g., increase intensity, decrease intensity, blink, change color, or another visual indication) from its current level when the light fixture is associated with the lighting group.

The embedded controller or processor of the light fixture may cause the association to be stored in a memory of the light fixture. For example, a lighting group identifier and an identifier (e.g., a network address or other identifier) of the wall station acting as the primary controller of the lighting group may be stored in the memory. In lighting control systems including a central controller, the lighting group identifiers and associated device identifiers may be alternatively or additionally stored in the central controller and/or in each device.

At block 740, the pairing mode may be exited. After all the devices to be associated with the lighting group have been selected, the technician may then return to the wall station selected as the control device for the lighting group and enter a second specified sequence of button presses or a selection on a touch screen display or otherwise interact with the wall station to cause the wall station to transmit an exit signal to the devices on the network. The embedded controller of the wall station may transmit signals to the devices on the network, or to a central controller, to cause the devices to exit the pairing mode. Upon exiting the pairing mode, the embedded controller or processor of each light fixture may cause the light fixtures to change their light intensity levels to different levels (e.g., increase intensity, decrease intensity, blink, change color, or another visual indication) from their current levels. Once a device has been paired, it will not enter pairing mode again during the commissioning process. Devices may be disassociated from their lighting groups, for example, by special commands issued from the embedded controller of the wall station controlling the lighting group, and again be available for pairing.

The method 700 may be embodied on a non-transitory computer readable medium, for example, but not limited to, the memory (e.g., the memory 130, 170, or memory of the central controller (not shown)) or other non-transitory computer readable medium known to those of skill in the art, having stored therein a program including computer executable instructions for making a processor, computer, or other programmable device execute the operations of the method.

It should be appreciated that the specific steps illustrated in FIG. 7 provide a particular method for commissioning a lighting control system according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Although the above examples may be described as using one or more sensors integrated with the light fixtures or located remotely from the light fixtures, embodiments in accordance with the present disclosure are not limited to this implementation. According to various aspects of the present disclosure, the one or more sensors may be a combination of sensors integrated with the light fixtures and located remotely from the light fixtures.

It should be appreciated that other implementations of other types of light fixtures deployed in conjunction with embodiments of the present disclosure are possible without departing from the scope of protection.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method for commissioning a lighting control system, the method comprising:
   selecting a control device for a lighting group in the lighting control system;
   receiving, via the control device for the lighting group, a first instruction to the lighting control system, the first instruction causing devices in the lighting control system to enter a pairing mode;
   selecting a first device to be associated with the control device based on motion of a person in a vicinity of the first device detected by a sensor;
   associating the first device with the lighting group for a specified space based on the motion detected by the sensor; and
   receiving, via the control device for the lighting group, a second instruction to the lighting control system and, in response to the second instruction, exiting the pairing mode by the devices in the lighting control system,
   wherein entering the pairing mode comprises reducing a sensitivity of the sensor and changing a visible operating characteristic of the first device.

2. The method of claim 1, wherein associating the first device with the lighting group comprises:
   storing in a data structure in a memory an identification of the control device and an identification of the first device associated with an identification of the lighting group.

3. The method of claim 2, wherein the data structure is stored in a memory of the control device and in a memory of the first device.

4. The method of claim 1, wherein:
   the first device is a light fixture, and
   entering the pairing mode comprises:
      reducing a sensitivity of the sensor; and
      changing an intensity of light emitted by the light fixture to a first level.

5. The method of claim 1, further comprising:
   in response to associating the first device with the lighting group, while in pairing mode, changing an intensity of light emitted by the first device from a first level to a second level, wherein the first device is a light fixture.

6. The method of claim 1, wherein the first device is a light fixture, and the motion is detected by an occupancy sensor embedded in the light fixture.

7. The method of claim 1, wherein the motion is detected by a directionally aware occupancy sensor.

8. The method of claim 1, wherein the motion is detected by a sensor mounted in a location in the specified space other than on the first device.

9. The method of claim 1, wherein the control device is a wall station, and the first instruction received by the wall station causes the wall station to broadcast a command to the first device to command the first device into the pairing mode.

10. The method of claim 1, wherein the control device is a wall station,
the first instruction received by the wall station is transmitted to a central controller, and
the central controller commands the first device into the pairing mode.

11. The method of claim 1, wherein:
the lighting control system is a wired system including a central controller configured to communicate with a plurality of networks,
the control device is communicatively coupled to a first network,
the first device is communicatively coupled to a second network, and
the central controller is configured to associate the control device on the first network with the first device on the second network.

12. A lighting control system, comprising:
a central controller;
a plurality of light fixtures in communication with the central controller; and
a control device in communication with the central controller, the control device configured to:
receive, via a user interface, a first instruction for the lighting control system to enter a pairing mode; and
transmit the first instruction to the central controller, the central controller configured to:
receive the first instruction; and
generate a first command to cause the plurality of light fixtures to enter a pairing mode, wherein in the pairing mode, each light fixture of the plurality of light fixtures is operable to:
receive an indication that motion occurred in a vicinity of one or more light fixtures of the plurality of the light fixtures, and
transmit a signal to the central controller from each of the one or more light fixtures of the plurality of light fixtures indicating that motion occurred in the vicinity of the one or more light fixtures of the plurality of light fixtures,
wherein entering the pairing mode comprises reducing a sensitivity of motion detection and changing a visible operating characteristic of each light fixture of the plurality of light fixtures, and
wherein in response to receiving the signal, the central controller is further configured to associate the one or more light fixtures of the plurality of light fixtures with a lighting group controlled by the control device.

13. The lighting control system of claim 12, wherein the central controller is further operable to:
store in a data structure in a memory an identification of the control device and an identification of one or more light fixtures of the plurality of light fixtures associated with an identification of the lighting group.

14. The lighting control system of claim 12, further comprising:

wherein in the pairing mode, each light fixture in the plurality of light fixtures changes its emitted light level to a first level, and
in response to being associated with a lighting group, each light fixture in the plurality of light fixtures associated with the lighting group changes its emitted light level to a second level as an indication that it has been associated with the lighting group.

15. The lighting control system of claim 12, wherein each light fixture in the plurality of light fixtures comprises an embedded occupancy sensor, and
motion in a vicinity of each light fixture in the plurality of light fixtures is detected by the occupancy sensor embedded in the light fixture.

16. The lighting control system of claim 12, further comprising:
a directionally aware occupancy sensor.

17. The lighting control system of claim 12, further comprising:
a sensor mounted in a location in the specified space other than on one of the plurality of light fixtures.

18. A system, comprising:
a plurality of light fixtures; and
a wall station in communication with the plurality of light fixtures, the wall station configured to:
receive, via a user interface, a first instruction for the system to enter a pairing mode; and
broadcast a command based on the first instruction to command the plurality of light fixtures into a pairing mode, wherein entering the pairing mode comprises reducing a sensitivity of motion detection and changing a visible operating characteristic of each light fixture of the plurality of light fixtures, wherein in the pairing mode, each light fixture of the plurality of light fixtures is operable to:
receive an indication that motion occurred in a vicinity of one or more light fixtures of the plurality of the light fixture, and
generate a signal to an embedded controller of the one or more light fixtures of the plurality of light fixtures indicating that motion occurred in the vicinity of the one or more light fixtures,
wherein in response to the signal, the embedded controller of the one or more light fixtures is further configured to associate the one or more light fixtures of the plurality of light fixtures with a lighting group controlled by the wall station, and
transmit a signal to the wall station indicating that the one or more light fixtures are associated with the wall station.

19. The system of claim 18, wherein the embedded controller of the one or more light fixtures is further configured to store in a data structure in a memory an identification of the wall station and an identification of one or more light fixtures of the plurality of light fixtures associated with an identification of the lighting group.

20. The system of claim 18, wherein the wall station is further configured to store in a data structure in a memory an identification of the wall station and an identification of one or more light fixtures of the plurality of light fixtures associated with an identification of the lighting group.

21. The system of claim 18, wherein each light fixture in the plurality of light fixtures comprises an embedded occupancy sensor, and
motion in a vicinity of each light fixture in the plurality of light fixtures is detected by the occupancy sensor embedded in the light fixture.

22. The system of claim 18, further comprising:
a directionally aware occupancy sensor.

23. The system of claim 18, further comprising:
a sensor mounted in a location in the specified space other than on one of the plurality of light fixtures.

* * * * *